United States Patent
Kohtani et al.

(10) Patent No.: US 6,208,432 B1
(45) Date of Patent: *Mar. 27, 2001

(54) IMAGE STORAGE CONTROL APPARATUS

(75) Inventors: Hideto Kohtani, Yokohama; Yoshiyuki Suzuki, Tokyo; Hiroshi Ohmura, Inagi; Masanori Sakai, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/859,812

(22) Filed: Mar. 30, 1992

(30) Foreign Application Priority Data

Apr. 1, 1991 (JP) .................................... 3-068482

(51) Int. Cl.[7] ........................................ H04N 1/04
(52) U.S. Cl. ........................................ 358/444; 358/448
(58) Field of Search ................ 382/36, 57, 204; 358/442, 444, 453, 455, 460, 462, 464, 465, 466, 467, 524, 530

(56) References Cited

U.S. PATENT DOCUMENTS

| 4,547,811 | * | 10/1985 | Ochi | 382/9 |
| 4,750,209 | * | 6/1988 | Shimura et al. | 382/9 |
| 4,856,075 | * | 8/1989 | Smith | 382/9 |
| 4,862,283 | * | 8/1989 | Smith | 358/464 |
| 4,996,503 | * | 2/1991 | Kanemitsu et al. | 358/462 |
| 5,008,760 | | 4/1991 | Shimizu et al. | 358/451 |
| 5,018,024 | * | 5/1991 | Tanioka | 358/457 |
| 5,034,990 | * | 7/1991 | Klees | 358/462 |
| 5,111,514 | * | 5/1992 | Ohta | 382/9 |

FOREIGN PATENT DOCUMENTS

| 0398184 | | 11/1990 | (EP) | H04N/1/32 |
| 0398185 | | 11/1990 | (EP) | H04N/1/32 |
| 0442054A2 | * | 11/1990 | (EP) | H04N/1/40 |
| 0411921 | | 2/1991 | (EP) | H04N/1/387 |
| 0442054 | | 8/1991 | (EP) | H04N/1/40 |
| 58-105665A | * | 6/1983 | (JP) | 358/462 |
| 60105367 | * | 6/1985 | (JP) | 358/462 |

* cited by examiner

Primary Examiner—Jerome Grant, II
(74) Attorney, Agent, or Firm—Fitzpatrick, Cella, Harper & Scinto

(57) ABSTRACT

An image storage control apparatus includes an input section for inputting an image, a determining section for determining a processing mode in accordance with a type of the image input by the input section, a processing section for processing the image input by the input section in accordance with the processing mode determined by the determining section, and a storage control section for causing the same storage medium to store the image processed by the processing section and processing mode data representing the processing mode determined by the determining section.

26 Claims, 12 Drawing Sheets

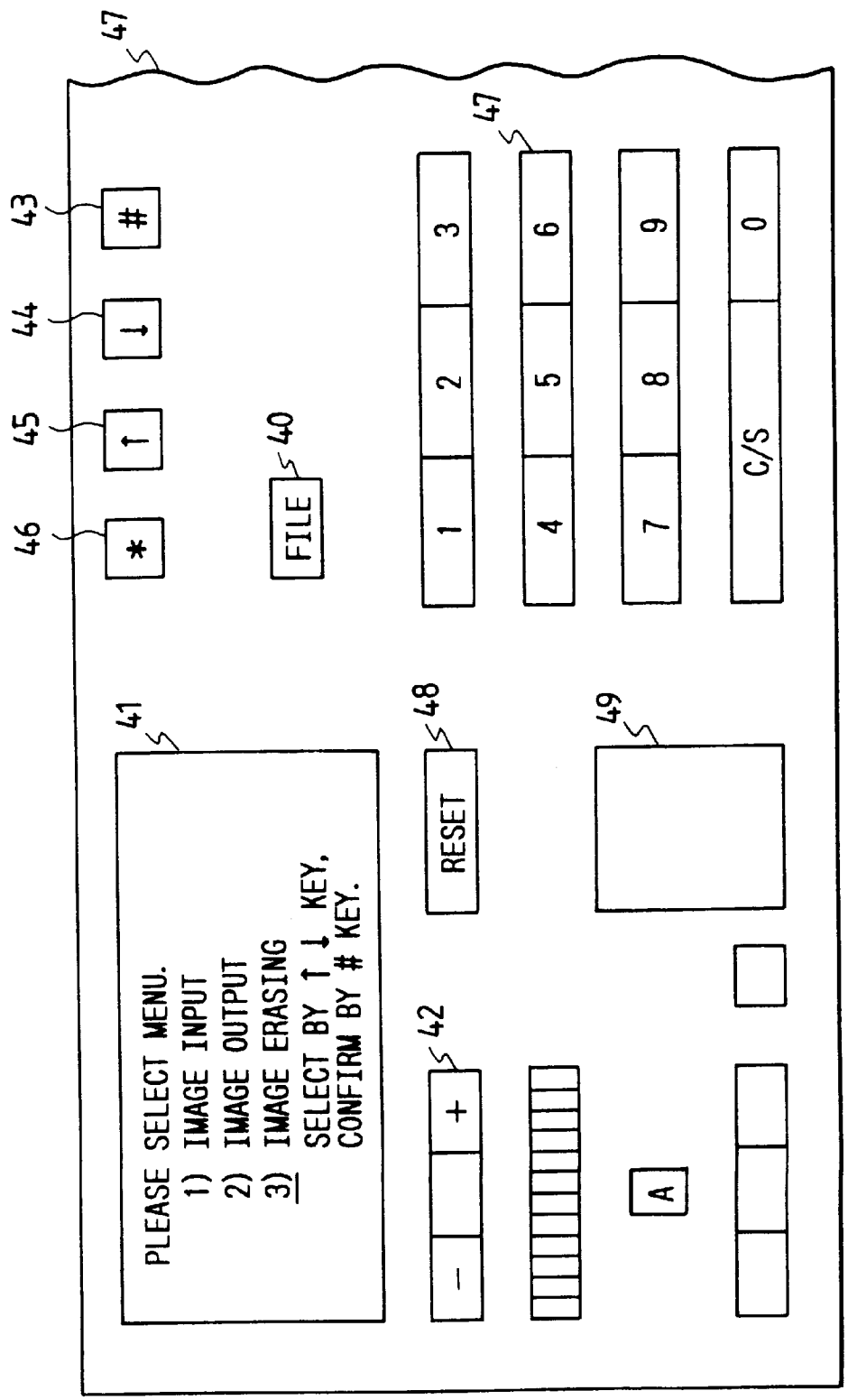

FIG. 8

| IMAGE STORING METHOD | 1. TWO-VALUE | 2. MULTIVALUE | 3. IMAGE AREA SEPARATION | 4. ... |
| CONVERSION METHOD | 1. THRESHOLD | 2. ERROR DIFFUSION | 3. DITHER | 4. ... |
| COMPRESSION METHOD | 1. RUN-LENGTH | 2. DCT | 3. MR | 4. ... |
| INDEX INFORMATION | 1. AREA | 2. NUMBER | 3. DATE | 4. ... |

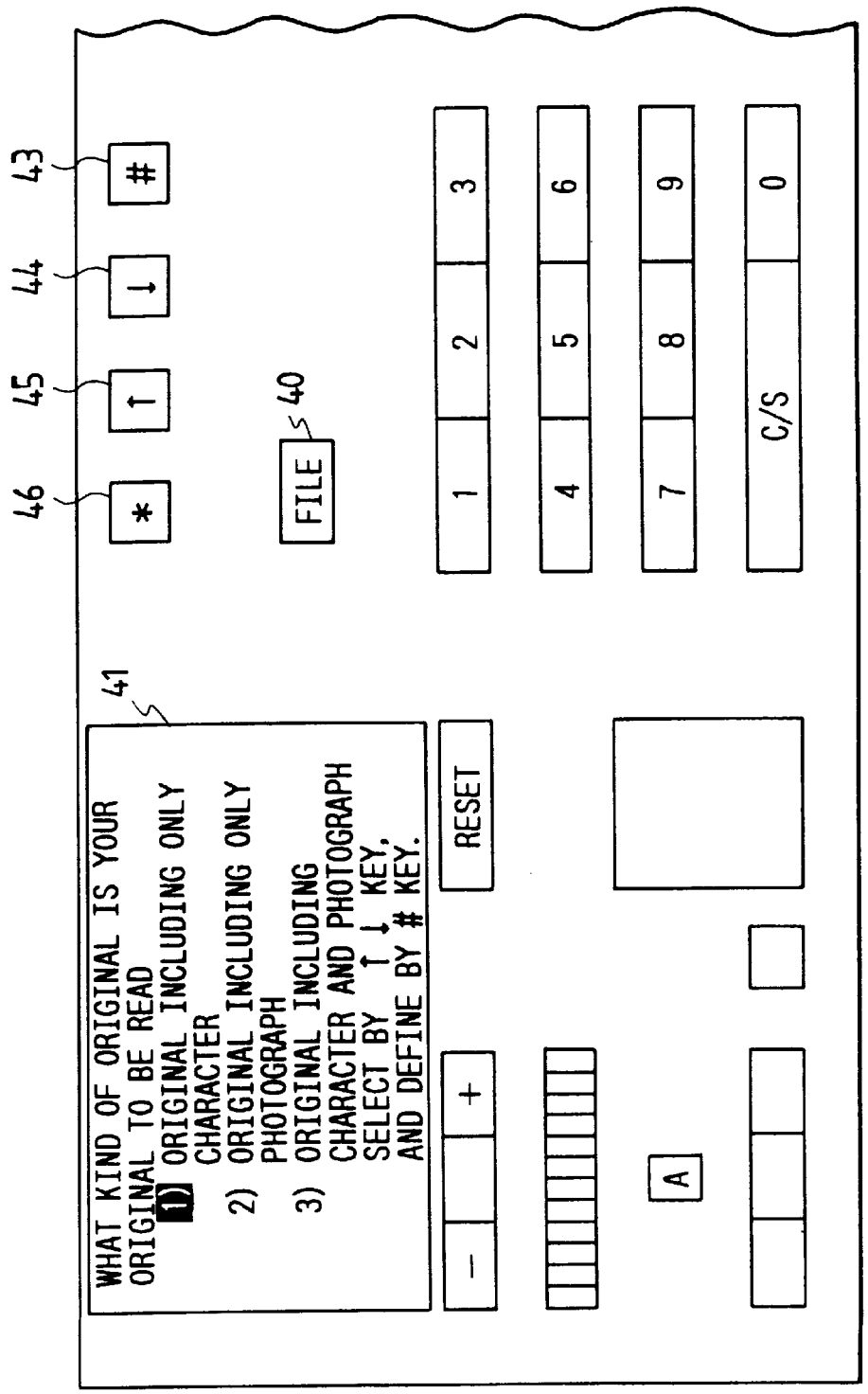

FIG. 10

MARK SHEET FOR DESIGNATING FILING METHOD
① WHAT KIND OF ORIGINAL IS YOUR ORIGINAL TO BE READ ?
- 102 ☐ ORIGINAL INCLUDING ONLY CHARACTER
- ☐ ORIGINAL INCLUDING ONLY PHOTOGRAPH
- ☐ ORIGINAL INCLUDING CHARACTER AND PHOTOGRAPH

② TO WHICH ITEM DO YOU WANT TO GIVE PRIORITY ?
- ☐ YOU WANT TO STORE MANY ORIGINALS ON DISC
- ☐ YOU WANT TO STORE PHOTOGRAPH WITH CLEARNESS
- ☐ YOU WANT TO STORE MANY PHOTOGRAPHS
- ☐ YOU WANT TO STORE MANY ORIGINALS INCLUDING CHARACTER AND PHOTOGRAPH

IMAGE STORAGE CONTROL APPARATUS

BACKGROUND OF THE INVENTION

1. Field of the Invention

The present invention relates to an apparatus having a detachable storage means such as a photo-magnetic disk and designed to store an image.

2. Related Background Art

Various types of image storage apparatuses for storing an image on a storage medium such as a magnetic disk or photo-magnetic disk have been proposed. In an apparatus disclosed in U.S. Pat. No. 5,008,760, after a specific type of halftone processing to be performed is designated with respect to a read photographic image, the image is stored on a magnetic disk. In addition, there has been proposed an apparatus capable of setting various filing modes in accordance with image storage forms.

When, however, standardized operations are to be performed by using these apparatuses, a filing mode must be set for each operation. This sometimes makes operation cumbersome.

SUMMARY OF THE INVENTION

It is an object of the present invention to provide an image storage control apparatus which can eliminate the above-described drawback.

It is another object of the present invention to provide an image storage control apparatus in which, when an image is stored on a storage medium, an image processing mode can be stored on a storage medium together with the image, thereby facilitating the subsequent image storing operation.

It is still another object of the present invention to provide an image storage control apparatus which can improve operability by storing images in storage media in accordance with processing modes determined in units of storage media (i.e., determined for each storage medium).

The above and other objects, features, and advantages of the present invention will be apparent from the following detailed description in conjunction with the accompanying drawings and the appended claims.

BRIEF DESCRIPTION OF THE DRAWINGS

FIG. 3 is a view showing an operation panel;

FIG. 8 is a view showing the data format of format mode data;

FIG. 9 is a view showing an example of a display in a format mode setting operation;

FIG. 10 is a view showing a mark sheet for a format mode setting operation;

DETAILED DESCRIPTION OF THE PREFERRED EMBODIMENTS

Embodiments of the present invention will be described below with reference to the accompanying drawings.

Figure 2:
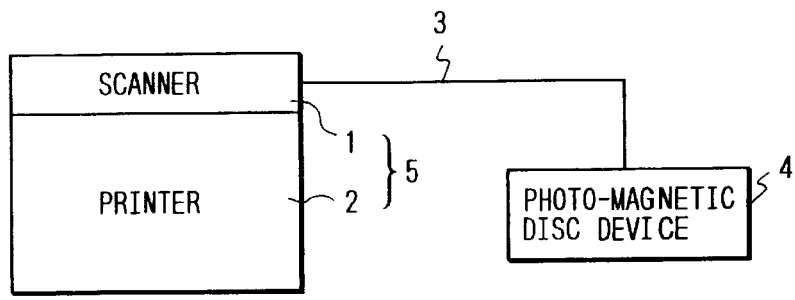
FIG. 2 is a block diagram showing a system arrangement according to an embodiment of the present invention.

FIG. 2 is a block diagram showing a system arrangement according to an embodiment of the present invention. This system includes a scanner (image reading unit) 1 included in a main body 5. Image data read by the scanner 1 is generally output from a printer 2 included in the main body 5. When image data read by the scanner 1 is to be filed, the image data is transferred to a photo-magnetic disk device 4 through a communication line 3. Since an image forming apparatus according to the present invention can process read image data as digital signals, various types of image processing can be performed.

Figure 1:
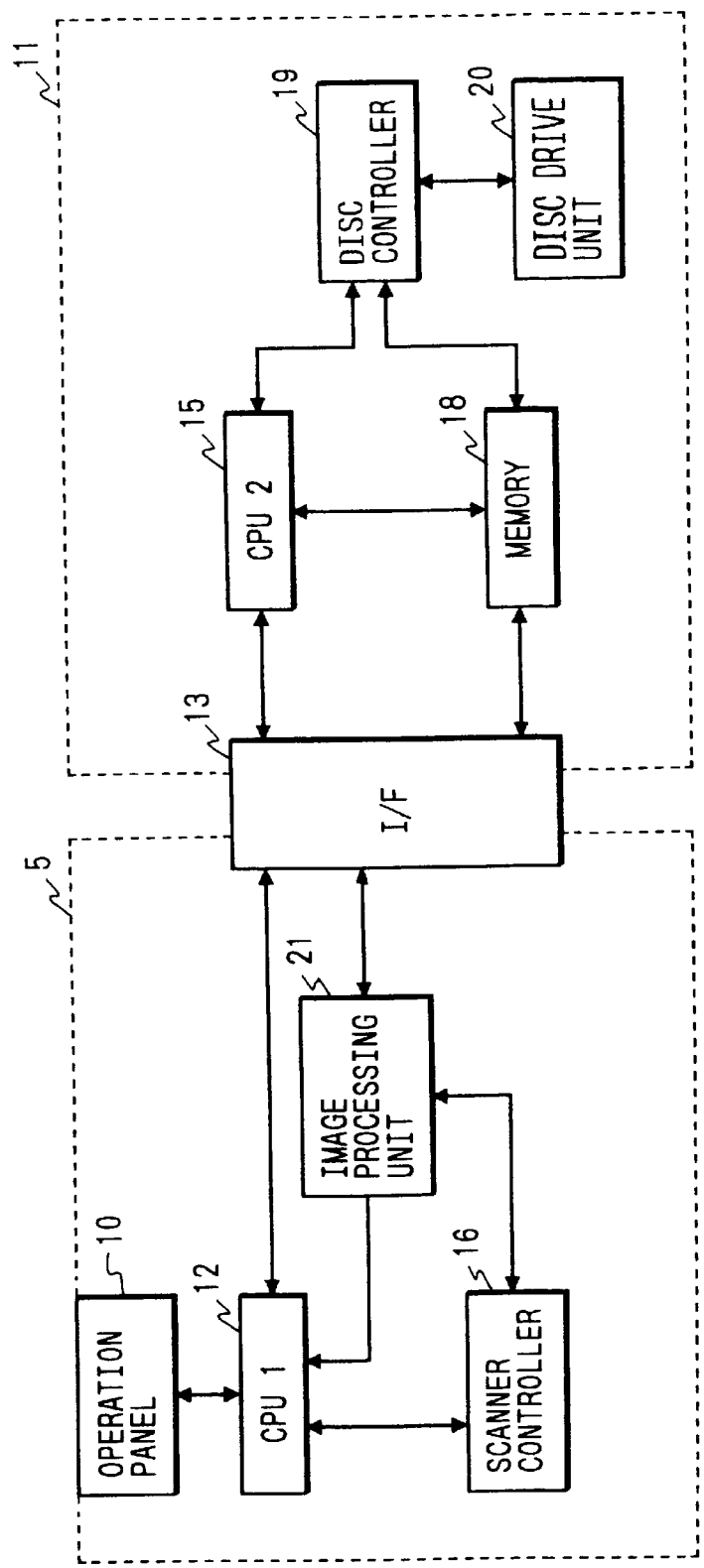
FIG. 1 is a block diagram showing an arrangement for controlling a filing operation.

FIG. 1 is a block diagram showing an arrangement for controlling a filing operation in such an image forming apparatus.

The apparatus main body 5 includes a CPU 12 for controlling the overall apparatus, an image processing unit 21 for performing various types of image processing with respect to the image data, a scanner controller 16 for controlling the scanner 1, and an operation panel 10 for performing various types of input and display operations.

On the photo-magnetic disk device 4 side, a filing unit 11 shown in FIG. 1 is arranged. This filing unit 11 includes a CPU 15 for performing control on the photo-magnetic disk device 4 side, a disk controller 19 for controlling an operation of the photo-magnetic disk device 4, a disk drive unit 20 having a photo-magnetic disk detachably set therein and designed to perform data read/write operations, and a memory 18 for image data development.

The main body 5 and the filing unit 11 are connected to each other through a filing interface 13.

FIG. 3 is a plan view showing the arrangement of the operation panel 10.

For example, the operation panel 10 includes a file operation key 40 for designating a filing operation for filing image data, an LCD display section 41 for displaying various operation screens and the like, an enlargement/reduction key 43, cursor/set keys 43 to 46, a ten-key pad 47 for inputting a copy count and numerical data, a reset key 48 for resetting a copy mode or a filing mode to a predetermined standard mode, and a start key 49 for starting a copy operation and a filing operation. On the display section 41, an operation screen for the image forming apparatus is normally displayed.

In the above-described arrangement, a normal operation is performed as follows. In accordance with an input from the operation panel 10, the CPU 12 instructs the scanner controller 16 to control the scanner 1 so as to read image data on an original set on the original table of the scanner 1. The read image data is then transferred, as multivalue image data, to the image processing unit 21.

The image processing unit 21 can convert this multivalue image data into binary image data by comparing each pixel of the image data with a predetermined threshold value, or can separate the original image data into a binary character data portion and a halftone image data portion or a dot image data portion by analyzing the spatial frequency of the image, or can extract only a designated region of the read image. In addition, the unit 21 can process the multivalue image data without conversion.

When image data is to be filed in a photo-magnetic disk, the file operation key 40 is depressed first to call the menu selection screen shown in FIG. 3 on the display section 41. On this screen, "IMAGE INPUT" is selected, and a read mode and an image number are input. Thereafter, the "#" key 43 is depressed to start an original image input operation. More specifically, the scanner 1 reads an original image and transmits the resultant image data to the filing unit 11 through the filing interface 13. The CPU 15 of the filing unit 11 causes the disk controller 19 to store the image data on the photo-magnetic disk set in the disk drive unit 20.

Image data stored on the photo-magnetic disk is output in the following manner. The file operation key 40 is depressed first to display the screen shown in FIG. 3. When "IMAGE OUTPUT" is selected, the screen is switched to an image selection screen (not shown). Thereafter, desired image data is selected by using the key 44 or 45 or the ten-key pad 47, and the "#" key 43 is depressed. The CPU 12 transfers the instruction to the CPU 15 to read out the image data from the photo-magnetic disk and transmit it to the image processing unit 21 through the filing interface 13. The data is further supplied to the printer 2 to be output as an image.

When an image is to be stored on a photo-magnetic disk inserted in the disk drive unit 20, the CPU 15 of the filing unit 11 stores the image data on the photo-magnetic disk in accordance with filing mode data stored on the disk. In a conventional image filing system of this type, a filing mode is set at the time when an image to be filed is read. However, in filing a large number of image data in the same photo-magnetic disk in accordance with a predetermined filing mode, if the filing mode is stored beforehand on the photo-magnetic disk, and the filing mode data is read out to set the filing mode prior to an image data storing operation, a complicated filing mode setting operation need not be repeated for each filing operation.

Assume that a photo-magnetic disk in which one of the following filing modes is stored, is inserted in the photo-magnetic disk drive 20. In this case, when the switch 40 for designating execution of a filing operation, arranged on the operation panel of the image forming apparatus in FIG. 3, is depressed, and "IMAGE INPUT" is selected, the filing mode stored on the disk is displayed on the display section 41, and a user can immediately execute filing without performing a complicated filing mode setting operation.

For example, the following filing modes, which can be processed by the image processing unit 21, are stored on the above-described photo-magnetic disk.

Photo-magnetic disk 1:

Image data read by the scanner is compared with a predetermined threshold value so as to be converted into binary data, and the binary data is stored on the disk.

An image portion in a designated region of each original image is stored as index information of the original image.

Image data is retrieved from the disk by outputting a list of index information corresponding to each original image data to allow a user to designate a number corresponding to each target image data.

Photo-magnetic disk 2:

Image data read by the scanner is stored, as multivalue data (i.e., having plural bits per pixel), on the disk.

The user inputs a number for each body of read image data through the operation panel, and the number is stored as index information.

Image data is retrieved from the disk by causing the user to designate a number corresponding to the target data.

Photo-magnetic disk 3:

The spatial frequency of image data read by the scanner is analyzed to separate the image data into a binary character data region and a halftone image or dot image data region.

The date of each body of image data read by the scanner is stored as index information.

An image portion in a designated region of each original image is stored as the index information of the original image.

Image data is retrieved from the disk by causing the user to designate a date corresponding to the target image data. Alternatively, image data is retrieved by outputting a list of image data in designated regions corresponding to the respective image data to allow the user to designate a number corresponding to each target image data.

Figure 4:
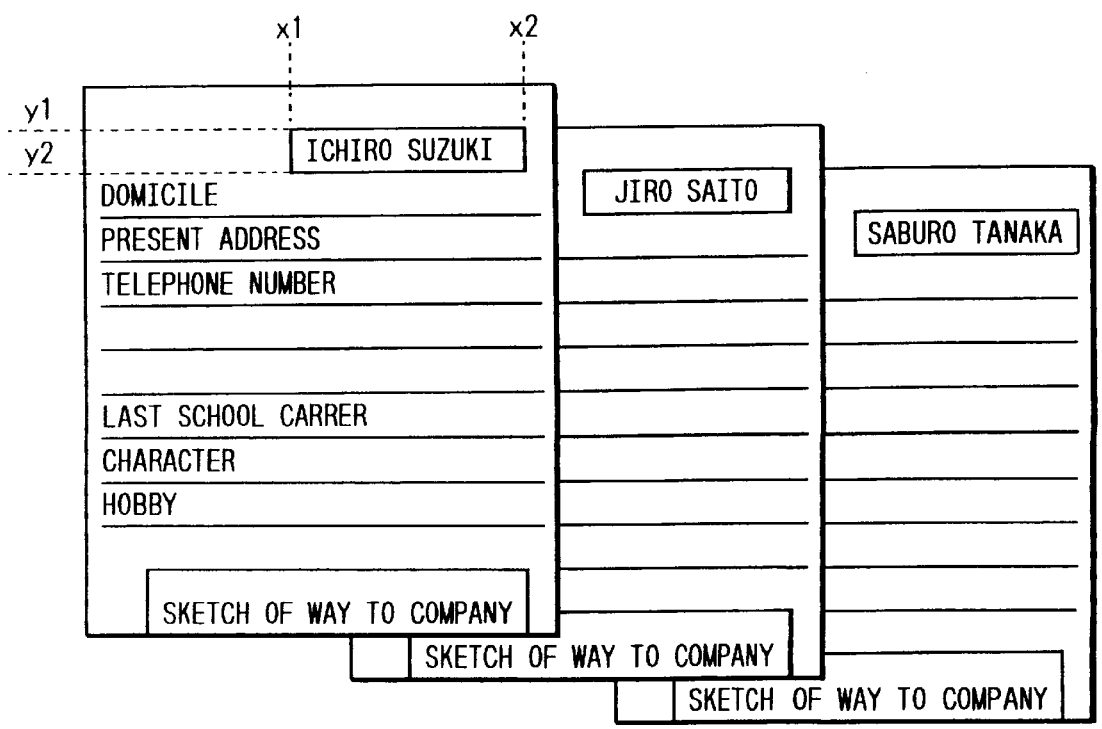
FIG. 4 is a view showing original images.

The photo-magnetic disk 1 is used for filing the personal records shown in FIG. 4, for example. Referring to FIG. 4, coordinates (x1,y1) and (x2,y2) of a name portion of each personal record are designated to store this region as the index information of each original image. In this case, since each set of image data is mostly constituted by character data, even if it is converted into binary data, almost no deterioration occurs. For this reason, each original image is converted into binary data in accordance with the filing mode stored on the photo-magnetic disk, and the binary data is stored on the disk. For retrieval, image data stored as pieces of index information are read out to be output from the printer 2 of the image forming apparatus 10 together with numbers corresponding to the respective image data. The user inputs a number on the output index information list through the operation panel of the image forming apparatus, thus retrieving desired image data from the photo-magnetic disk.

The photo-magnetic disk 2 is used for storing photographic data, for example. If halftones of photographic data are not expressed, the contents of the resultant image are difficult to discriminate. For this reason, each image data read by the scanner 1 is stored, as multivalue data, on the photo-magnetic disk. When each image data is stored on the photo-magnetic disk, a corresponding number is stored as index information. Therefore, the user can retrieve desired photographic data by inputting a corresponding number.

The photo-magnetic disk 3 is used for filing newspaper articles, for example. Newspaper articles include character portions and picture portions expressed by dots. A character portion can be efficiently processed as binary data in terms of compression ratio. However, since a picture portion is constituted by a dot image, if it is processed as binary data, moiré and the like are produced to greatly degrade the image quality. For this reason, in the image processing section of the image forming apparatus, character and picture portions are separated from each other and stored. In addition, a date portion of each newspaper is set as the above-mentioned designated region, and predetermined processing is performed with respect to this region by the CPU 15 and the memory 18, thereby performing pattern recognition of character information. If the date of publication of each newspaper is automatically stored, as index information, on the photo-magnetic disk, the user can obtain a newspaper article of the desired date of publication by inputting the corresponding date in a data retrieving operation.

Image input processing will be described next.

Figures 5, 5A:
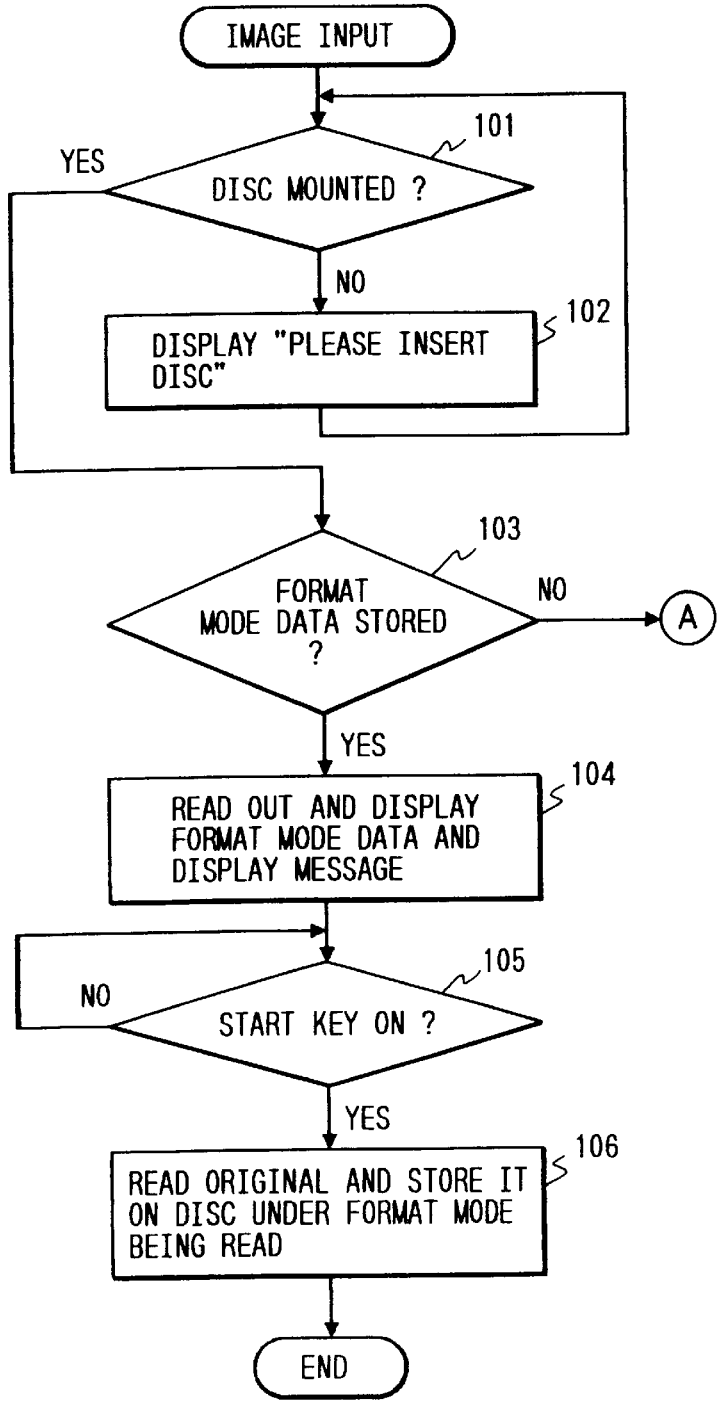
FIG. 5, consisting of FIGS. 5A and 5B is a flow chart showing a sequence of image input processing.
Figure 5B:
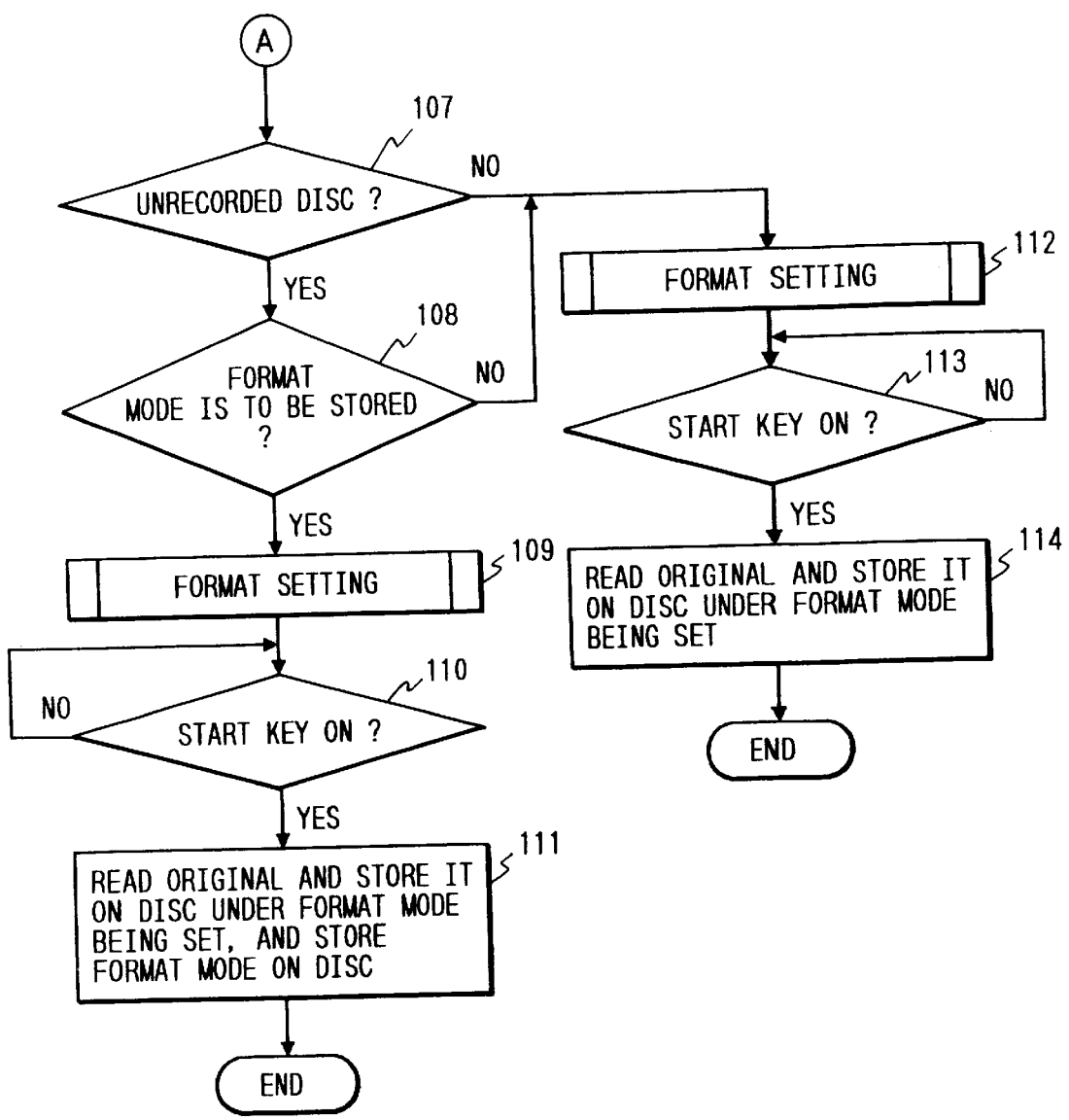
Figure 6:
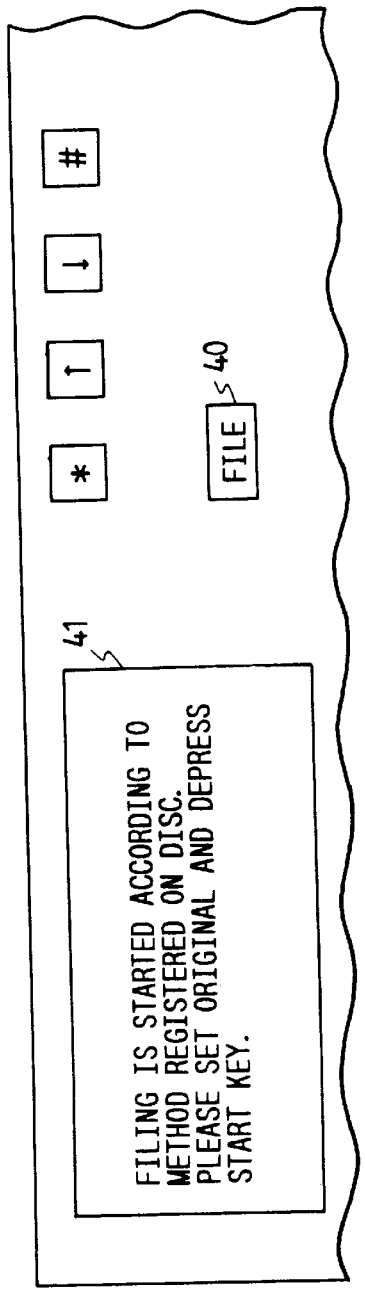
FIG. 6 is a view showing an example of a display in an image storing operation.

FIG. 5 is a flow chart showing a sequence of image input processing. When an image input mode is selected through the operation panel, it is checked whether a photo-magnetic disk is inserted in the photo-magnetic disk device 4 (step 101). If no disk is inserted, a message "PLEASE INSERT DISK" is displayed on the display section 41 (step 102). If a disk is inserted, it is checked whether format mode data (filing mode data) is stored on the disk (step 103). If YES in step 103, the format mode data is read out to set a corresponding format mode, and the format mode is displayed, thus performing the display shown in FIG. 6 (step 104). Subsequently, when an original is set, and the start key 49 is depressed (step 105), the scanner 1 is operated to read image data on the original, the original image data is processed in accordance with the format mode read out from the disk, and the resultant data is stored on the disk (step 106).

If it is determined in step 103 that no format mode data is stored on the disk, it is checked whether the disk is an unrecorded disk (in which no image data is stored) (step 107). If it is an unrecorded disk, it is checked whether the operator decides to store a format mode on the disk (step 108). If a format mode for storing image data in the disk is to be fixed, processing for storing a format mode is selected. In addition, if the format mode for storing image data in the disk is to be changed for each image, processing for inhibiting storage of the format mode is selected. When the operator selects the processing for storing the format mode, format mode setting is performed (step 109). If the start key 49 is depressed (step 110), the scanner 1 is operated to read image data on the original, the original image data is processed in accordance with the set format mode, and the resultant data is stored on the disk. Furthermore, the set format mode is stored on the disk (step 111). If the operator selects the processing for inhibiting storage of the format mode, a format mode is set (step 112). When the start key 49 is depressed (step 113), the scanner 1 is operated to read image data on the original, the original image data is processed in accordance with the set format mode, and the resultant data is stored on the disk (step 114). Note that after the original image data is stored on the disk in steps 106, 111, and 114, another original image can be additionally stored by depressing the start key 49. In addition, if an automatic original feeder is used, image input processing is continued until all the original images are stored on the disk.

Format mode setting will be described next.

Figure 7:
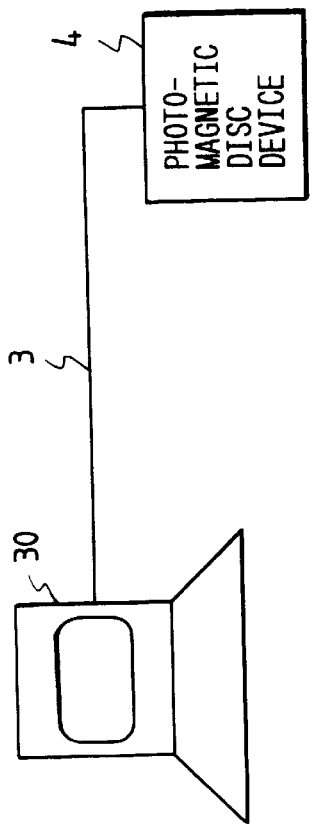
FIG. 7 is a view showing an arrangement for a format mode setting operation.

FIG. 7 shows an arrangement for setting a format mode. In this arrangement, the filing system connected to the image forming apparatus shown in FIG. 2 is connected to a general-purpose personal computer 30. The personal computer 30 incorporates software for allowing a user to select data indicating one of the above-described filing modes so as to write the data in photo-magnetic disk. The user sets data indicating a filing mode in an interactive scheme in accordance with the software.

For example, the user answers the following questions in accordance with his/her requirements:

① "WHAT KIND OF ORIGINAL IS READ?"
  1) ORIGINAL INCLUDING ONLY CHARACTER IMAGE
  2) ORIGINAL INCLUDING ONLY PHOTOGRAPHIC IMAGE
  3) ORIGINAL INCLUDING CHARACTER AND PHOTOGRAPHIC IMAGES

② "TO WHICH ITEM DO YOU WANT TO GIVE PRIORITY?"
  1) YOU WANT TO STORE MANY ORIGINAL IMAGES ON DISK
  2) YOU WANT TO STORE PHOTOGRAPH WITH HIGH IMAGE QUALITY
  3) YOU WANT TO STORE MANY PHOTOGRAPHS
  4) YOU WANT TO STORE MANY ORIGINALS INCLUDING CHARACTER AND PHOTOGRAPHIC IMAGES

The selected contents are written in the photo-magnetic disk in accordance with the data format shown in FIG. 8. For example, as an image storing method, "TWO-VALUE", "MULTIVALUE", "IMAGE AREA SEPARATION", or the like can be selected. As an image data conversion method, "THRESHOLD" (fixed), "ERROR DIFFUSION", "DITHER", or the like can be selected. As an image data compression method, "RUN-LENGTH", "DCT" (discrete cosine transform), "MR", or the like can be selected. As index information for retrieval, "AREA" (data in designated areas), "NUMBER", "DATE" (dates of storing operations), or the like can be selected.

In the above setting operation, assume that item 1) is selected for question ①, and item 1) is selected for question ②. In this case, if "TWO-VALUE" is set as a storing method, the utilization efficiency of the disk can be increased by setting a method with a high compression ratio, e.g., "MR", as a compression method. If item 3) and item 4) are respectively selected for questions ① and ②, "IMAGE AREA SEPARATION" is selected as a storing method, and "MR" is selected as an optimal method for both separated character and photograph portions. With this selection, a character portion is stored as binary data, and "MR" or the like is adapted therefor, whereas a photograph portion is stored as multivalue data. In addition, since a suitable method in terms of compression ratio and repeatability, e.g., vector quantization, can be adapted, the overall compression ratio can be increased, while image filing which satisfies the taste of a user can be realized.

In this manner, a method of processing image data to be stored is written on a photo-magnetic disk. Subsequently, therefore, image data are written on the disk in accordance with this processing method.

In addition, as a method of selecting format modes, a method of setting modes through the operation panel of the image forming apparatus without using a personal computer may be employed. When the file key 40 is depressed, and "IMAGE INPUT" is selected, the screen shown in FIG. 9 is displayed, if format mode setting is required. With this display, a desired format mode can be set by using the keys 43 to 45.

In another format mode setting method, a format mode is set by using the scanner 1 and a mark sheet. The mark sheet shown in FIG. 10 is read by the scanner 1 and stored in the memory 18. The CPU 15 recognizes each mark position of the mark sheet by a black mark 101, and compares a portion at each mark position with a predetermined threshold value to check whether the portion is painted out. A rectangular block 102 located on the left side of each choice on the mark sheet in FIG. 10 is a mark position. If this block is painted out, the CPU 15 recognizes that the corresponding choice is selected. By using such a mark sheet scheme, a user can easily set a format mode.

The second embodiment of the present invention will be described next. In addition to the functions of the first embodiment, the second embodiment includes a function of copying a format mode, stored on a disk, to another disk.

Figure 11:
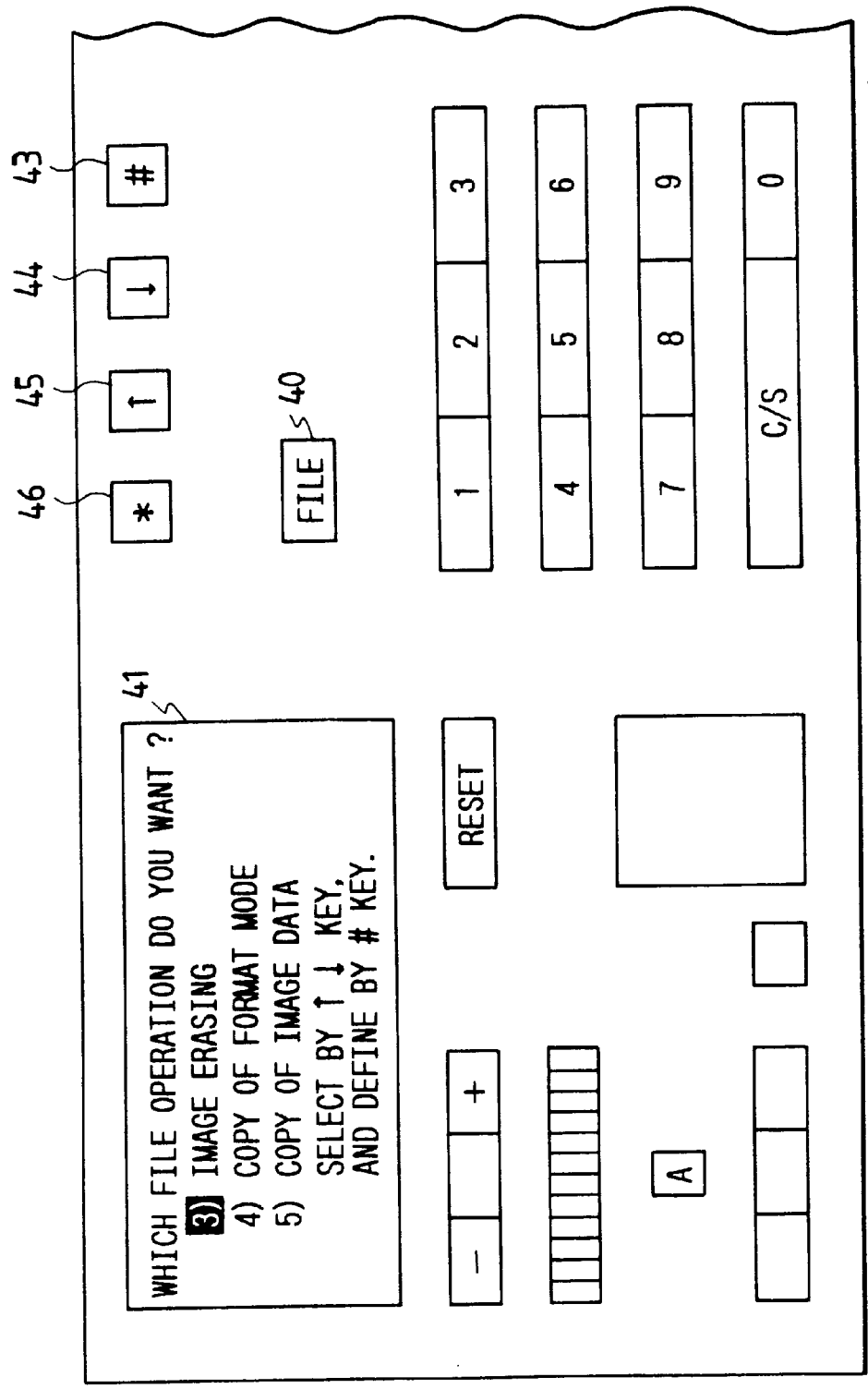
FIG. 11 is a view showing an example of a display in selection of a format mode copy operation.
Figure 12:
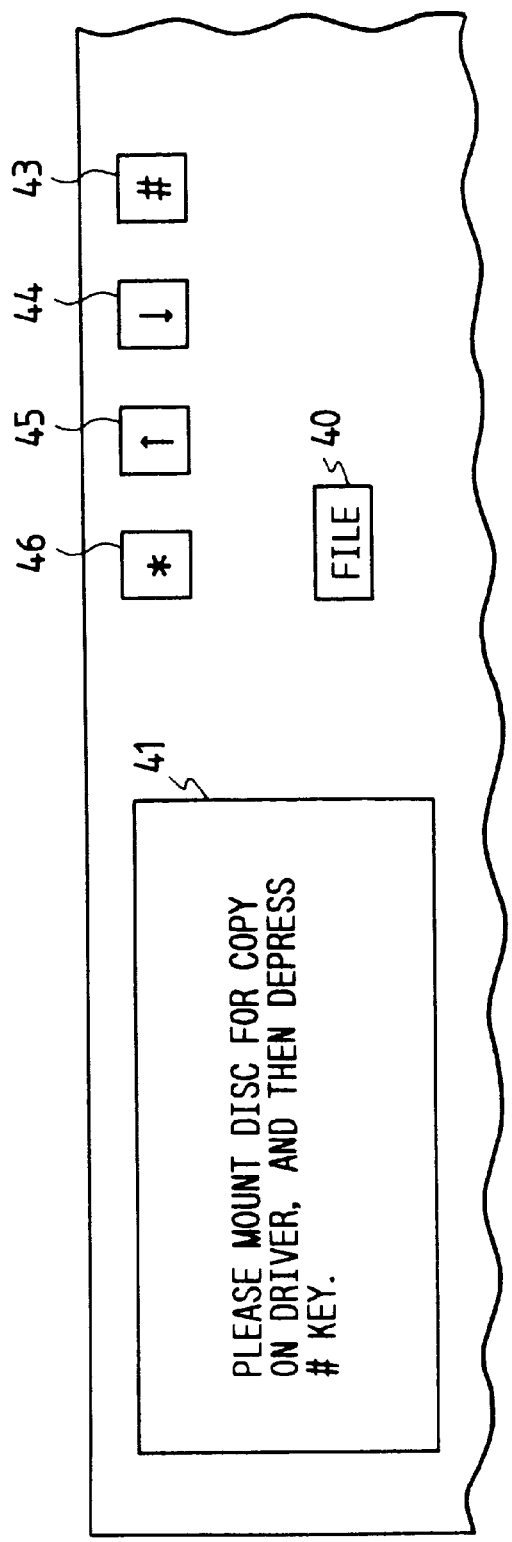
FIG. 12 is a view showing an example of a display in a format mode data copy operation.

After a designation switch 40 on an operation panel is depressed to display the screen shown in FIG. 3, a key 44 is depressed to display the screen shown in FIG. 11. When item 4) is selected, and a key 43 is depressed, a format mode can be copied. A CPU 1 transfers the instruction to a CPU 2 through an interface 13. In accordance with the instruction, the CPU 2 reads only a format mode from a loaded disk and stores it in the memory 18. When the storing operation is completed, the CPU 1 causes a display section 1 to display the message shown in FIG. 12. When another disk is loaded, and the key 43 is depressed, the CPU 2 causes the newly loaded disk to store the data which has been stored in the memory 18. In this manner, only a method of controlling an image data reading means or its data storing method, stored in a given disk, can be stored on another disk.

Figure 13:
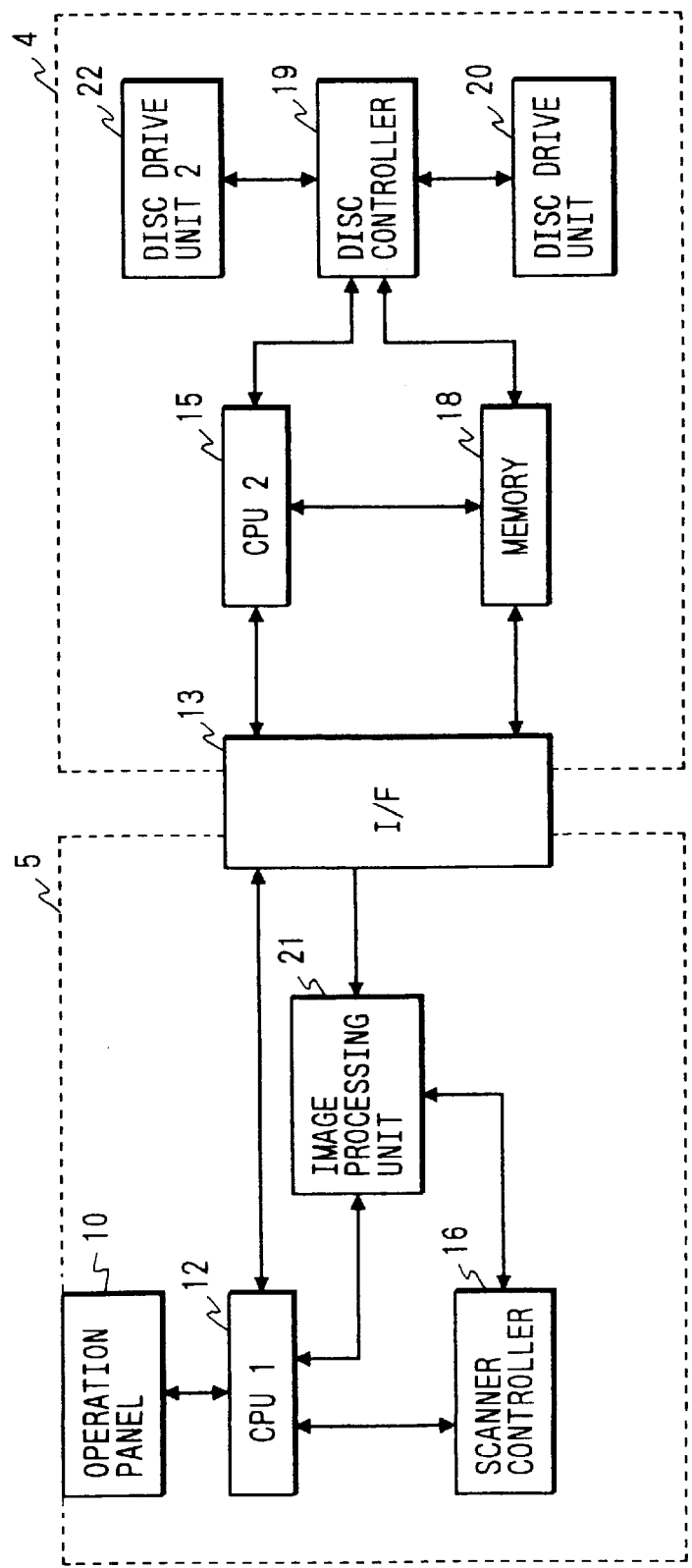
FIG. 13 is a block diagram showing the arrangement of another embodiment of the present invention.

The above-described embodiment is a method to be employed for a system having only one disk drive. FIG. 13 shows the arrangement of this embodiment. A disk controller 19 can selectively drive two disk drive units 20 and 22 upon a switching operation. Assume that a disk storing a method of controlling an image reading means or a method of storing image data is loaded in the disk drive unit 20, and an unrecorded disk storing no data is loaded in the disk unit drive 22. When copying of format mode data in the unrecorded disk is designated in the same manner as described in the previous embodiment, the CPU 2 instructs the disk controller 19 to read out only the format mode data from the disk loaded in the disk drive unit 20 and store it in the memory 18. Subsequently, the disk controller 19 is instructed to write the read contents on the disk loaded in the disk drive unit 22. If the storage capacity for the format mode data exceeds that of the memory 18, the above-described operation is repeated a plurality of times to copy all the contents. This embodiment can omit the disk exchanging operation, unlike the previous embodiment. In addition, the embodiment is efficient in copying a large number of image data, stored on a disk, in another disk.

In each embodiment described above, one format data is stored on one disk. However, the storage area of a disk may be divided into a plurality of blocks so that different format data are respectively stored in the blocks, thus allowing one disk to store image data in a plurality of types of format modes. In this case, prior to an image storing operation, a specific block of the disk on which image data is to be stored is designated through the operation panel.

In addition, after format mode data stored on a disk is read out to set a format mode, a new format mode may be added. More specifically, minimum necessary format mode data is prestored on a disk, and necessary format data is added to a format mode read out the disk for each image data. Image data is then stored on the disk in accordance with the newly determined format mode.

The present invention is not limited to the embodiments described above. Various changes and modifications can be made within the scope defined by the appended claims.

What is claimed is:

1. An image storage control apparatus comprising:
   input means for inputting images of a plurality of originals to be stored on a storage medium on which a plurality of images are storable and processing mode data representing a processing mode necessary to store the images of the originals has been prestored;
   reading-out means for reading out the processing mode data prestored on said storage medium;
   processing means for processing, in common, a plurality of images of the originals input by said input means in accordance with the processing mode data read out by said reading-out means, wherein the input images are processable by said processing means, in common, without a manual setting of the processing mode by an operator, every time each of the plurality of images is input; and
   storage control means for causing the images processed by said processing means to be stored in said storage medium so that the images of the originals are retrievable, and maintaining the images in said storage medium even if a new image other than the images is stored in said storage medium,
   wherein said processing mode data is maintained in said storage medium after the images are stored in said storage medium so that said processing mode data is effective for the new image different from the images.

2. An apparatus according to claim 1, further comprising discriminating means for discriminating the processing mode data stored on the storage medium, wherein said discriminating means discriminates a method of converting the images input by said input means into digital data.

3. An apparatus according to claim 1, wherein said storage medium is detachably set to said image storage control apparatus.

4. An apparatus according to claim 1, further comprising discriminating means, wherein said discriminating means discriminates a method of converting the images input by said input means.

5. An image storage control apparatus comprising:
   input means for inputting an image;
   determining means for determining a processing mode in accordance with a type of the image input by said input means;
   processing means for processing the image input by said input means in accordance with the processing mode determined by said determining means; and
   storage control means for causing a same storage medium to store the image processed by said processing means and processing mode data representing the processing mode determined by said determining means,
   wherein said determining means comprises key input means for setting a processing mode.

6. An apparatus according to claim 5, wherein when the image is to be stored on the storage medium on which the processing mode has already been stored, said storage control means performs control to read out the processing mode data from the storage medium, and causes said processing means to process the image, input by said input means, in accordance with the read processing mode data.

7. An apparatus according to claim 5, wherein said determining means identifies a processing mode by reading a sheet original on which data designating the processing mode is written.

8. An apparatus according to claim 5, wherein said determining means determines a method converting the image input by said input means into digital data.

9. An image storage control apparatus comprising:
   input means for inputting an image;
   determining means for determining a processing mode in accordance with a type of image input by said input means;
   processing means for in common processing a plurality of images input by said input means in accordance with the processing mode determined by said determining means; and
   storage control means for causing a same storage medium to store the plurality of images processed by said processing means and common processing mode data for the plurality of images, representing the processing mode determined by said determining means, wherein said determining means identifies a processing mode by reading a sheet original on which data designating the processing mode is written.

10. An image storage control apparatus comprising:

input means for inputting an image;

determining means for determining a processing mode in accordance with a type of the image input by said input means;

processing means for processing the image input by said input means in accordance with the processing mode determined by said determining means; and storage control means for causing a same storage medium to store the image processed by said processing means and processing mode data representing the processing mode determined by said determining means, wherein said determining means determines a method of compressing the image input by said input means.

11. An image storage control apparatus comprising input means for inputting an image;

setting means for setting an image processing mode required to store the image input by said input means on a storage medium;

processing means for processing the image in accordance with the processing mode set by said setting means;

control means for checking whether processing mode data representing a processing mode is stored on the storage medium on which the image input by said input means is stored, operating said processing means in accordance with the processing mode set by said setting means when no processing mode data is stored on the storage medium, and operating said processing means in accordance with processing mode data read out from the storage medium when the processing mode data is stored on the storage medium; and storage control means for, when no processing mode data is stored on the storage medium, causing the storage medium to store the processing mode data representing the processing mode set by said setting means in accordance with an instruction from an operator.

12. An image storage control apparatus comprising:

input means for inputting an image to be stored on a storage medium, wherein a plurality of images and processing mode data representing a processing mode necessary to store the image are storable on said storage medium;

setting means for manually setting an image processing mode required to store the image input by said input means on a storage medium;

processing means for processing, in common, a plurality of images in accordance with the processing mode set by said setting means; and control means for checking whether processing mode data has been prestored on said storage medium, operating said processing means in accordance with the processing mode set by said setting means when no processing mode data is prestored on said storage medium, and operating said processing means in accordance with processing mode data read out from said storage medium so that the plurality of images input by said input means are processed in a common processing mode when the processing mode data is prestored on the storage medium; and storage control means for causing said storage medium to store the image data processed by said processing means so that the image data is retrievable.

13. An apparatus according to claim 12, wherein said setting means sets a method of converting the image input by said input means into digital data.

14. An apparatus according to claim 12, wherein said storage medium is detachably set to said image storage control apparatus.

15. An apparatus according to claim 12, wherein said setting means sets a processing mode by reading a sheet on which data designating the processing mode is written.

16. An image storage control apparatus comprising:

input means for inputting an image;

setting means for setting an image processing mode required to store the image input by said input means on a storage medium;

processing means for processing the image in accordance with the processing mode set by said setting means; and control means for checking whether processing mode data representing a processing mode is stored on the storage medium on which the image input by said input means is stored, operating said processing means in accordance with the processing mode set by said setting means when no processing mode data is stored on the storage medium, and operating said processing means in accordance with processing mode data read out from the storage medium when the processing mode data is stored on the storage medium, wherein said setting means sets a method of compressing the image input by said input means.

17. A method of storing images on a storage medium, comprising the steps of:

inputting images of a plurality of originals to be stored on the storage medium on which a plurality of images are storable and processing mode data representing a processing mode necessary to store the images of the originals has been prestored;

reading out the processing mode data prestored on the storage medium;

processing, in common, a plurality of images of the originals input in said inputting step in accordance with the processing mode data read out in said reading-out step, said processing step being performed, in common, without requiring a manual setting of a processing mode by an operator, every time each of said plurality of images is input; and causing the storage medium to store the plurality of images processed in the processing step so that the images of the originals are retrievable, and maintaining the images in the storage medium even if a new image other than the images is stored in the storage medium, wherein said processing mode data is maintained in the storage medium after the images are stored in the storage medium so that said processing mode data is effective for the new image different from the images.

18. A method according to claim 17, wherein the storage medium can be detachably loaded in a drive device for storing an image.

19. A method according to claim 17, further comprising the step of discriminating the processing mode data prestored on the storage medium, wherein the discriminating step comprises discriminating a method of converting the images input in said inputting step into digital data.

20. A method according to claim 17, further comprising the step of reading out only the processing mode data from the storage medium on which the processing mode data and the images have already been stored, and storing the processing mode data on a different storage medium.

21. A method of storing an image on a storage medium, comprising the steps of:

inputting image data of an original;

determining a processing mode for performing image processing required to store the input image data on the storage medium;

processing the input image data in accordance with the determined processing mode; and causing a same storage medium to store the processed image data and processing mode data representing the processing mode, wherein the determining step comprises determining a method of compressing the input image.

22. A method of storing images in a storage medium, comprising the steps of:

an input step, of inputting images to be stored on the storage medium, wherein a plurality of images and processing mode data representing a processing mode necessary to store the images are storable on the storage medium;

a setting step, of manually setting the processing mode necessary to store the images input in said inputting step on the storage medium;

a processing step, of processing, in common, a plurality of images input in said inputting step, in accordance with the processing mode;

a control step, of checking whether processing mode data is prestored on the storage medium, and controlling operation in the processing step so as to process the plurality of images in accordance with the processing mode set in said setting step when no processing mode data is prestored on the storage medium, and controlling operation in the processing step so as to process the plurality of images in accordance with the processing mode data read out from the storage medium so that the plurality of images are processed in a common processing mode when the processing mode data is prestored on the storage medium; and a storage control input step, of causing the storage medium to store the plurality of images processed in said processing step so that the images are retrievable.

23. A method according to claim 22, wherein the storage medium can be detachably loaded in a drive device for storing an image.

24. A method according to claim 22, wherein the processing mode includes a method of compressing the input images.

25. A method according to claim 22, wherein the processing mode includes a method of converting the input images into digital data.

26. A method of storing an image in a storage medium, comprising the steps of:

inputting image data of an original;

checking whether a storage medium for storing the input image data stores processing mode data representing an image processing mode required to store the image on the storage medium;

processing, when processing mode data is stored on the storage medium, the input image in accordance with the stored processing mode data;

processing the input image in accordance with processing mode input by an operator when no processing mode data is stored in the storage medium;

storing the processed image on the storage medium; and causing the storage medium to store processing mode data representing a processing mode input by an operator when the processing mode data is not stored on the storage medium.

* * * * *

UNITED STATES PATENT AND TRADEMARK OFFICE
CERTIFICATE OF CORRECTION

PATENT NO. : 6,208,432 B1
DATED : March 27, 2001
INVENTOR(S) : Hideto Kohtani et al.

It is certified that error appears in the above-identified patent and that said Letters Patent is hereby corrected as shown below:

Title page,
Item [56], References Cited, U.S. PATENT DOCUMENTS, "4,996,503" should read -- 4,996,603 --; and
FOREIGN PATENT DOCUMENTS, "0442054A2 * 11/1990 (EP)" should be deleted; and "60105367" should read -- 60-105367 --.

Column 1,
Line 52, "5B" should read -- 5B, --.

Column 9,
Line 21, "comprising" should read -- comprising: --.

Signed and Sealed this

Twenty-third Day of November, 2004

JON W. DUDAS
*Director of the United States Patent and Trademark Office*